(12) United States Patent
Kashiwagi (10) Patent No.: US 9,497,344 B2
(45) Date of Patent: Nov. 15, 2016

(54) IMAGE FORMING APPARATUS WHICH DETECTS A BLANK PAGE FROM AN IMAGE OF A DOCUMENT, METHOD FOR CONTROLLING THE SAME, AND STORAGE MEDIUM

(71) Applicant: CANON KABUSHIKI KAISHA, Tokyo (JP)

(72) Inventor: Masaki Kashiwagi, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/629,397

(22) Filed: Feb. 23, 2015

(65) Prior Publication Data
US 2015/0242717 A1 Aug. 27, 2015

(30) Foreign Application Priority Data
Feb. 25, 2014 (JP) .................................. 2014-034455

(51) Int. Cl.
*H04N 1/00* (2006.01)
*G06K 15/16* (2006.01)

(52) U.S. Cl.
CPC ................................ *H04N 1/00551* (2013.01)

(58) Field of Classification Search
None
See application file for complete search history.

(56) References Cited

U.S. PATENT DOCUMENTS

| | | | | |
|---|---|---|---|---|
| 5,231,516 A * | 7/1993 | Kamon | .............. | H04N 1/32358 358/296 |
| 8,264,710 B2 * | 9/2012 | Burkes | .............. | H04N 1/00931 358/1.13 |
| 2001/0022672 A1 * | 9/2001 | Matsui | .................. | H04N 1/401 358/461 |
| 2001/0024298 A1 * | 9/2001 | Yoshida | .................. | H04N 1/21 358/444 |
| 2001/0051064 A1 * | 12/2001 | Yokoyama | ......... | H04N 1/00931 400/70 |
| 2001/0056406 A1 * | 12/2001 | Nagoya | .................. | G06Q 30/06 705/52 |
| 2005/0094208 A1 * | 5/2005 | Mori | ....................... | G06F 17/24 358/1.18 |
| 2008/0187344 A1 * | 8/2008 | Yoshizawa | ......... | G03G 15/6573 399/76 |
| 2008/0204783 A1 * | 8/2008 | Sugimoto | .......... | H04N 1/00413 358/1.13 |
| 2009/0080033 A1 * | 3/2009 | Arai | .................... | H04N 1/00803 358/462 |
| 2009/0097076 A1 * | 4/2009 | Fujiwara | .............. | H04N 1/2038 358/448 |
| 2009/0213408 A1 * | 8/2009 | Miyata | .................. | G06F 3/1207 358/1.13 |
| 2011/0075187 A1 * | 3/2011 | Imine | ................. | H04N 1/00442 358/1.14 |
| 2015/0271360 A1 * | 9/2015 | Sodeura | .............. | H04N 19/103 358/450 |

FOREIGN PATENT DOCUMENTS

JP 2010-178377 A 8/2010

* cited by examiner

*Primary Examiner* — Ming Hon
(74) *Attorney, Agent, or Firm* — Canon USA, Inc., IP Division (57) ABSTRACT

In a case where a conveyed document is a first page, printing is started before a result of determination as to whether the document is a blank page is output, whereby a time until a first sheet is output can be shortened.

9 Claims, 12 Drawing Sheets

IMAGE FORMING APPARATUS WHICH DETECTS A BLANK PAGE FROM AN IMAGE OF A DOCUMENT, METHOD FOR CONTROLLING THE SAME, AND STORAGE MEDIUM

BACKGROUND OF THE INVENTION

Field of the Invention

The present invention relates to an image forming apparatus, a method for controlling the image forming apparatus, and a storage medium.

Description of the Related Art

In image forming apparatuses such as a digital copying machine, there are mainly two types of document reading methods. One is a method (an optical system moving method) of placing a document on a platen to fix a document position and reading an image by reciprocating an optical system to scan the document. The other is a method (a feeding-reading method) of fixing the position of an optical system and reading an image while conveying a document by a document feeding unit (a document feeder (DF)).

Conventionally, in the image forming apparatuses such as the digital copying machine, even a blank page having no image printed thereon has been subjected to print processing when a read document is output, causing unnecessary paper consumption. Thus, there has been developed a blank page detection technology for suppressing unnecessary paper consumption by removing pages determined to be blank (Japanese Patent Application Laid-Open No. 2010-178377).

In the conventional technology, irrespective of what number-th page the read document is, printing has been started after output of a result of determination as to whether the read document is blank.

When a surface of a document placed on the DF is blank, a user is likely to recognize that the document is blank.

However, in the conventional technology, even for the first page, printing has been started after output of blank determination result, and thus the printing start has been delayed.

SUMMARY OF THE INVENTION

According to an aspect of the present invention, an image forming apparatus includes a reading unit configured to read an image of a conveyed document, a printing unit configured to print, on a sheet, the image of the document read by the reading unit, a detection unit configured to detect a blank page from the image of the document read by the reading unit, a determination unit configured to determine whether the document read by the reading unit is a first page, and a control unit configured to, in a case where the determination unit determines that the document read by the reading unit is a first page, notify the printing unit of completion of image output preparation before the detection unit detects a blank page, and in a case where the determination unit determines that the document read by the reading unit is not a first page, notify the printing unit of the completion of the image output preparation after the detection unit detects the blank page.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>

[Outline of Image Forming Apparatus 400]

Figure 1:
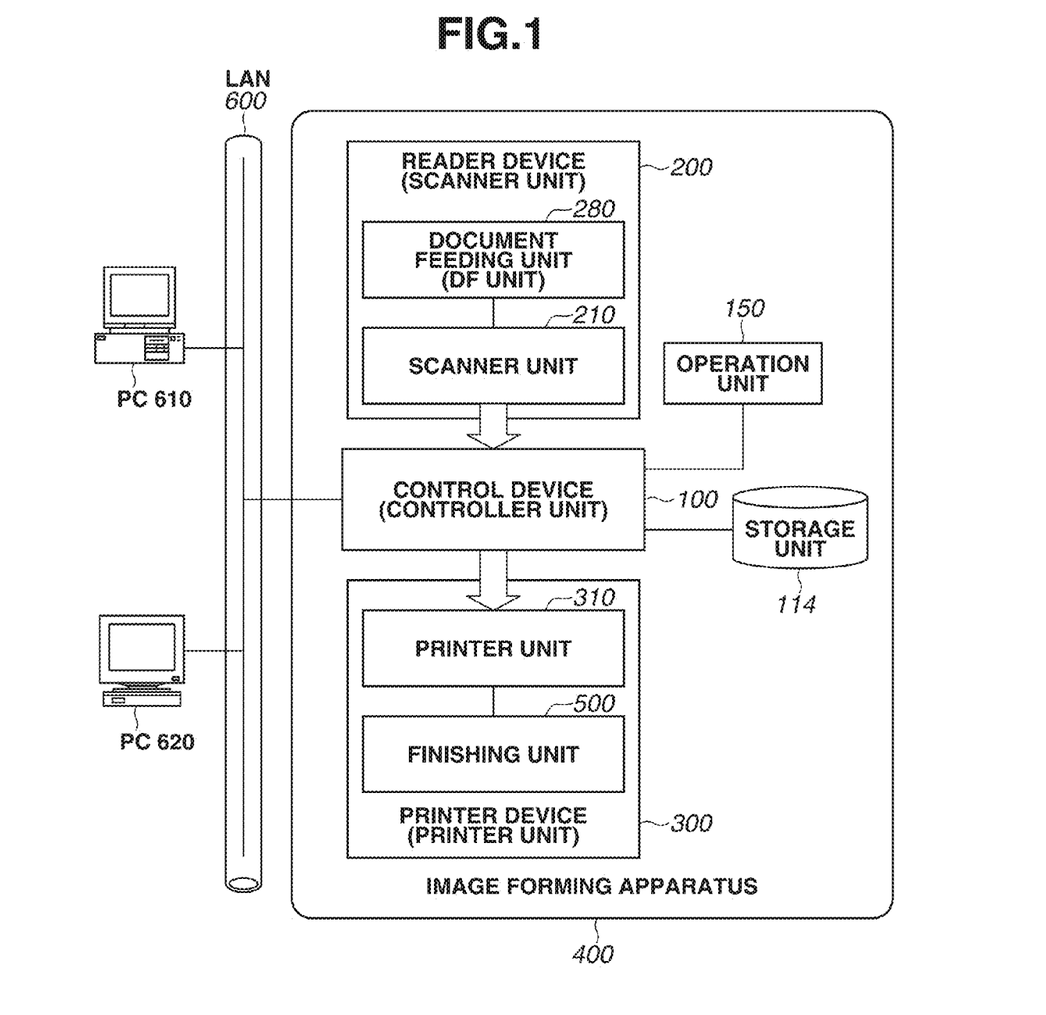
FIG. 1 is a diagram illustrating a configuration of an image forming system including an image forming apparatus.

FIG. 1 is a diagram illustrating a configuration of an image forming system including an image forming apparatus according to a first exemplary embodiment.

In FIG. 1, an image forming apparatus 400 is connected to a host computer via a local area network (LAN) 600 such as Ethernet (registered trademark). The present exemplary embodiment is directed to a case where two computers, specifically, first and second host computers (hereinafter, simply referred to as host computers) 610 and 620, are connected to the image forming apparatus 400.

The image forming apparatus 400 includes a reader device (scanner unit) 200 configured to read image data, and a printer device (printer unit) 300 configured to output the image data. The image forming apparatus 400 also includes an operation unit 150 including a keyboard for inputting/outputting the image data and a liquid crystal panel for displaying/setting the image data or various types of functions.

The image forming apparatus 400 further includes a storage unit 114 configured to store image data read by controlling the scanner unit 200 and image data generated from code data received from the host computers 610 and 620 via the LAN 600. A control device (controller unit) 100 including a single electronic component and configured to control these components is connected.

The scanner unit 200 includes a document feeding unit 280 configured to convey a document sheet, and a scanner unit 210 configured to optically read a document image and convert the read image into image data as an electric signal. The printer unit 300 includes a printer unit 310 including, for example, a sheet feeding cassette configured to store a sheet on which printing is to be performed, and a unit configured to transfer/fix the image data onto a print sheet. The printer unit 300 also includes a finishing unit 500 configured to execute sort processing or staple processing on a recording sheet on which printing has been performed.

The controller unit 100 includes a plurality of functional blocks: for example, a copy function of reading the image data of the document by controlling the scanner unit 200 and outputting the image data on the recording sheet by controlling the printer unit 300, a scanner function of converting the image data read from the scanner unit 200 into code data and transmitting the code data to the host computers 610 and 620 via the LAN 600, and a printer function of converting the code data received from the host computers via the LAN 600 into image data and outputting the image data to the printer unit 300.

[Configuration of Controller Unit 100]

Figure 2:
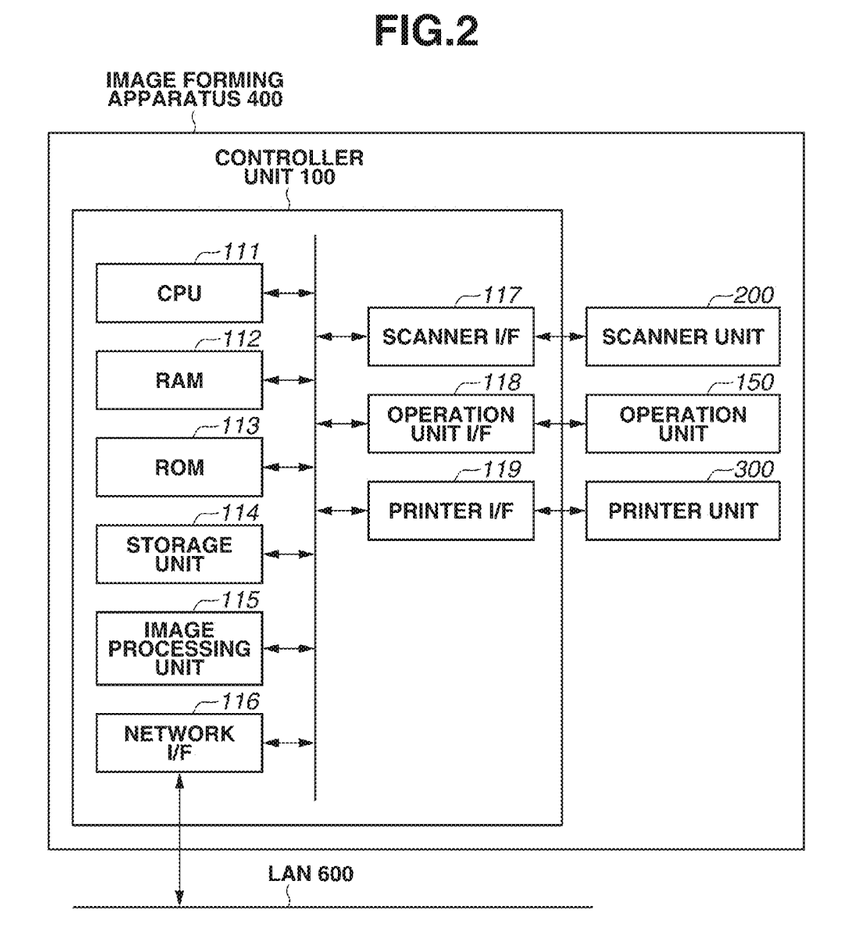
FIG. 2 is a block diagram illustrating a configuration of the image forming apparatus.

FIG. 2 is a block diagram illustrating a configuration of the image forming apparatus 400 illustrated in FIG. 1. Hereinafter, the controller unit 100 of the image forming apparatus 400 will be described in detail.

In FIG. 2, the controller unit 100 is connected to the scanner unit 200 serving as an image input device, and controls input of image information. Meanwhile, the controller unit 100 is connected to the LAN 600, and transmits a transmission job via the LAN 600. The controller unit 100 is further connected to the printer unit 300 serving as an image output device, and controls output of the image information. A central processing unit (CPU) 111 controls an operation of the image forming apparatus 400, and operates based on a program stored in a random access memory (RAM) 112. A read-only memory (ROM) 113 is a boot ROM configured to store a boot program of a system.

The storage unit 114 stores, for example, system software, image data, and a program for controlling the operation of the image forming apparatus 400. The programs stored in the ROM 113 and the storage unit 114 are loaded into the RAM 112, and the CPU 111 controls, based on the programs, the operation of the image forming apparatus 400. An image processing unit 115 executes image correction on image data input from a scanner interface (I/F) 117.

A network I/F 116 is connected to the LAN 600, and inputs or outputs various types of information via the network. The scanner I/F 117 connects the scanner unit 200 serving as an image input device and the controller unit 100 to execute synchronous or asynchronous conversion of the image data. An operation unit I/F 118 is an interface for connecting the operation unit 150 and the controller unit 100, and outputs, to the operation unit 150, the image data to be displayed thereon.

In addition, the operation unit I/F 118 transmits, to the CPU 111, information input by a user from the operation unit 150. A printer I/F 119 connects the printer unit 300 serving as an image output device and the controller unit 100 to execute synchronous or asynchronous conversion of the image data, and image processing for print output. The operation unit 150 includes an input device for enabling the user to issue an execution instruction of a function of the image forming apparatus 400, or to perform an operation setting for the execution of the function. The operation unit 150 also includes a display device for notifying the user of a state of the image forming apparatus 400.

[Configuration of Image Forming Apparatus 400]

Figure 3:
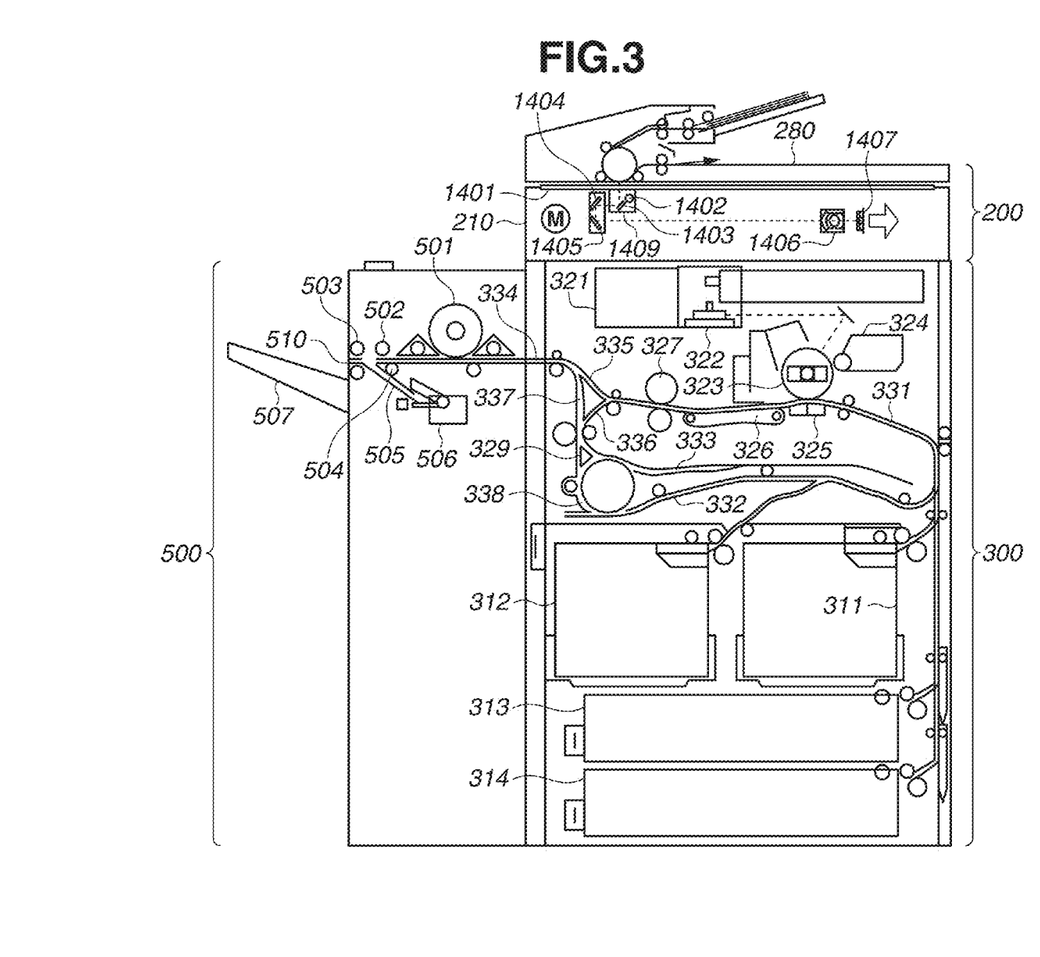
FIG. 3 is a sectional view illustrating an example of the image forming apparatus illustrated in FIG. 1.

FIG. 3 is a sectional view illustrating an example of the image forming apparatus 400 illustrated in FIG. 1.

First, the scanner unit 200 will be described. Detailed description will be given below.

In the scanner unit 200, the document feeding unit (DF unit) 280 feeds documents one by one starting from the first page, to a platen glass 1401, and discharges the documents on the platen glass 1401 after the end of a document reading operation.

The documents conveyed onto the platen glass 1401 are illuminated by an illumination lamp 1402 in a first mirror unit 1409. Reflected light generated by the illumination passes through mirrors 1403, 1404, and 1405, and forms, by a lens 1406, an image on a charge-coupled device (CCD) sensor (hereinafter, referred to as CCD) 1407. Accordingly, a scanned document image is read by the CCD 1407. Image data output from the CCD 1407 is subjected to predetermined processing to be transferred to the controller unit 100.

Next, the printer unit 300 will be described.

The printer unit 300 includes a laser driver 321 configured to drive a laser emission unit 322. The laser driver 321 causes the laser emission unit 322 to emit a laser beam according to the image data output from the controller unit 100. This laser beam is applied onto a photosensitive drum 323, and a latent image according to the laser beam is formed on the photosensitive drum 323. A developer is adhered by a developing device 324 to the latent image part of the photosensitive drum 323.

The printer unit 300 includes cassettes 311, 312, 313, and 314, each of which functions as a sheet feeding unit and has a drawer shape. The user draws each sheet feeding cassette, supplies sheets into the drawn cassette, and then closes the cassette.

The printer unit 300 feeds a recording sheet from any of the cassettes 311 to 314, and conveys the recording sheet through a conveyance path 331 to a transfer unit 325. The transfer unit 325 transfers the developer adhered to the photosensitive drum 323 onto the recording sheet. The recording sheet carrying the developer is conveyed to a fixing unit 327 by a conveyance belt 326, and the developer is fixed onto the recording sheet by heat and pressure of the fixing unit 327.

Then, the recording sheet having passed through the fixing unit 327 passes through conveyance paths 335 and 334 to be discharged. For discharging the recording sheet by reversing a print side, the recording sheet is led to conveyance paths 336 and 338, and conveyed in a reverse direction to be passed through conveyance paths 337 and 334. When two-sided recording is set, after passing through the fixing unit 327, the recording sheet is led from the conveyance path 336 to a conveyance path 333 by a flapper 329, and then conveyed in a reverse direction to be led to the conveyance path 338 and a sheet refeeding conveyance path 332 by the flapper 329. The recording sheet led to the sheet refeeding conveyance path 332 passes through the conveyance path 331 at the aforementioned timing to be led to the transfer unit 325. Irrespective of one-sided or two-sided recording, the recording sheet discharged from the conveyance path 334 is conveyed to the finishing unit 500.

The recording sheet conveyed to the finishing unit 500 is initially fed to a buffer unit 501. Depending on cases, the conveyed recording sheet is wound around a buffer roller to be buffered. For example, when processing such as stapling to be performed on the downstream side takes time, the use of the buffer unit 501 enables a conveyance speed of the recording sheet conveyed from the main apparatus to be maintained constant, thereby contributing to improvement of throughput.

Then, the recording sheet is passed through a conveyance path 510 by an upstream discharge roller pair 502 and a downstream discharge roller pair 503 to be discharged to a discharge tray 507.

In the case of a staple mode, the recording sheet conveyed by the upstream discharge roller pair 502 is pulled back by a knurling belt 504 immediately after a rear end of the recording sheet passes through the roller pair 502, and discharged to a stack tray 505. Then, after a predetermined number of recording sheets are stacked, the recording sheets are subjected to staple processing by a stapling unit 506, and discharged to the discharge tray 507 by the downstream discharge roller pair 503.

In the case of shift sorting, sheets stacked on the stack tray are shifted left and right, and discharged to the discharge tray 507, thereby representing separation between sets of documents. In the case of normal stapling, after the recording sheets discharged from the conveyance path 334 are stacked on the stack tray 505, stapling is performed.

[Configuration of Scanner Unit 200]

Figure 4:
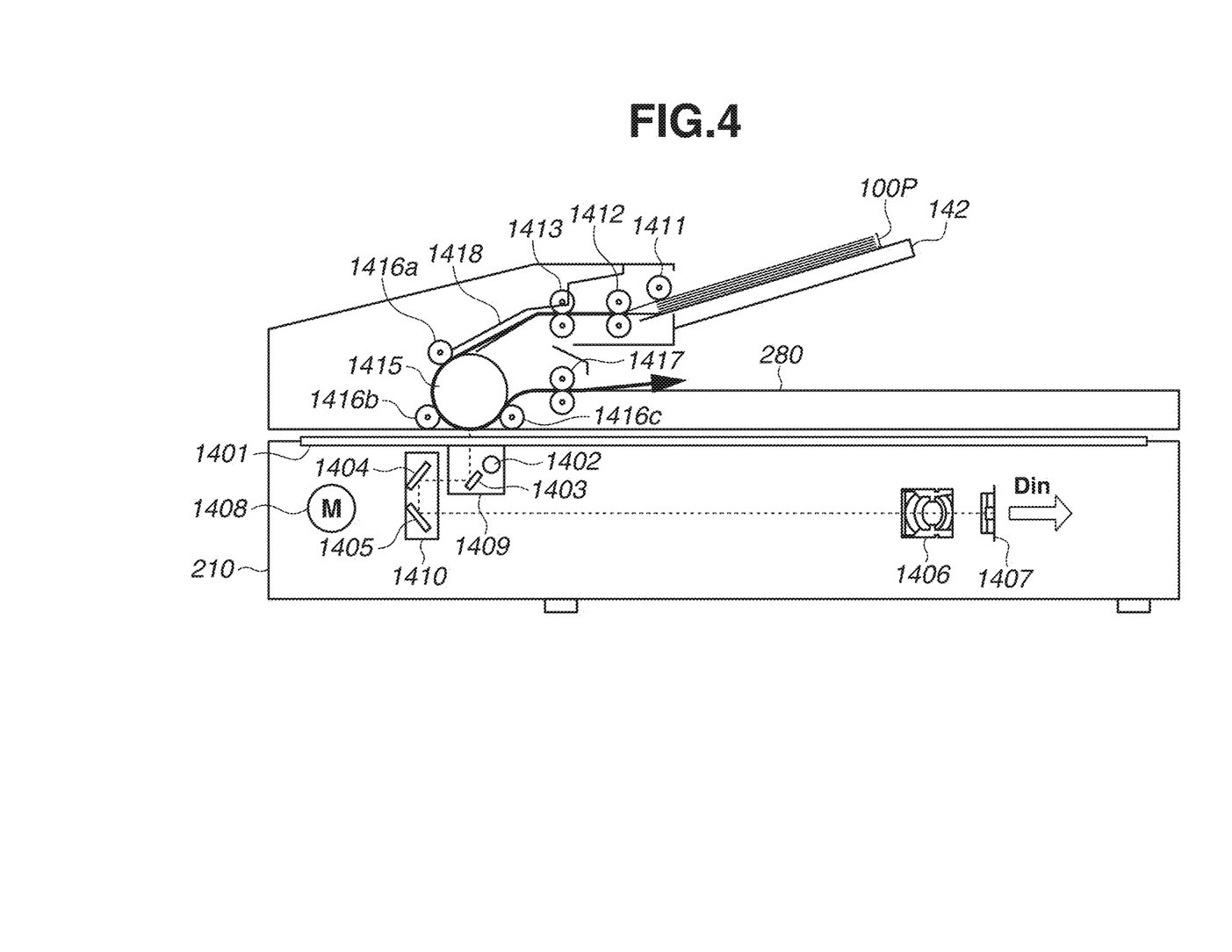
FIG. 4 is a sectional view illustrating a configuration of a scanner unit illustrated in FIG. 3.

FIG. 4 is a sectional view illustrating a configuration of the scanner unit 200 illustrated in FIG. 3.

Referring to FIG. 4, main components and a reading operation of the scanner unit 200 using a linear image sensor, according to the present exemplary embodiment will be described. FIG. 4 schematically illustrates main components and a reading operation particularly in the case of "feeding-reading", that is, reading the document by operating the document feeding unit 280.

In FIG. 4, a document bundle 100P to be read is placed on a tray 142. A feeding roller 1411, a separation conveyance roller 1412, and a registration roller 1413 are arranged in a lower part of a document conveyance direction. The feeding roller 1411 is rotated by a driving source (not illustrated) to feed the document bundle 100P placed on the tray 142. Then, the separation conveyance roller 1412 disposed downstream of the feeding roller 1411 separates an uppermost document from the conveyed document bundle 100P to convey the document. A rotational start of the registration roller 1413 disposed on the downstream side of the separation conveyance roller 1412 is used as a reference of a conveyance timing of the document and an image reading timing thereafter.

A driving source for driving the feeding roller 1411, the separation conveyance roller 1412, and the registration roller 1413 is, for example, a stepping motor.

The document discharged from the registration roller 1413 advances along a guide plate 1418, is nipped between a rotating large-diameter conveyance drum 1415 and driven rollers 1416a, 1416b, and 1416c, and is conveyed along an outer circumference of the conveyance drum 1415. At this time, the document is conveyed through a surface of the platen glass 1401 of the scanner unit 210 in a direction indicated by an arrow illustrated in FIG. 4, and image reading is carried out. After the image reading, the document is conveyed along the outer circumference of the conveyance drum 1415, and discharged by a discharge roller 1417.

In the feeding-reading mode, since the documents only need to be conveyed in a fixed direction, a large volume of documents can be continuously read at a high speed.

In the feeding-reading mode, the document passes through the surface of the platen glass 1401 of the scanner unit 210. At this time, the first mirror unit 1409 and a second mirror unit 1410 are moved by a motor 1408 to be fixed at positions illustrated in the drawing. The document is illuminated by the illumination lamp 1402 in the first mirror unit 1409 when it faces the surface of the platen glass 1401. Reflected light generated by the illumination passes through the mirrors 1403 to 1405, and forms, by the lens 1406, an image on the CCD sensor 1407 serving as a reading device 220 (FIG. 5).

[Scanner Unit 210]

Figure 5:
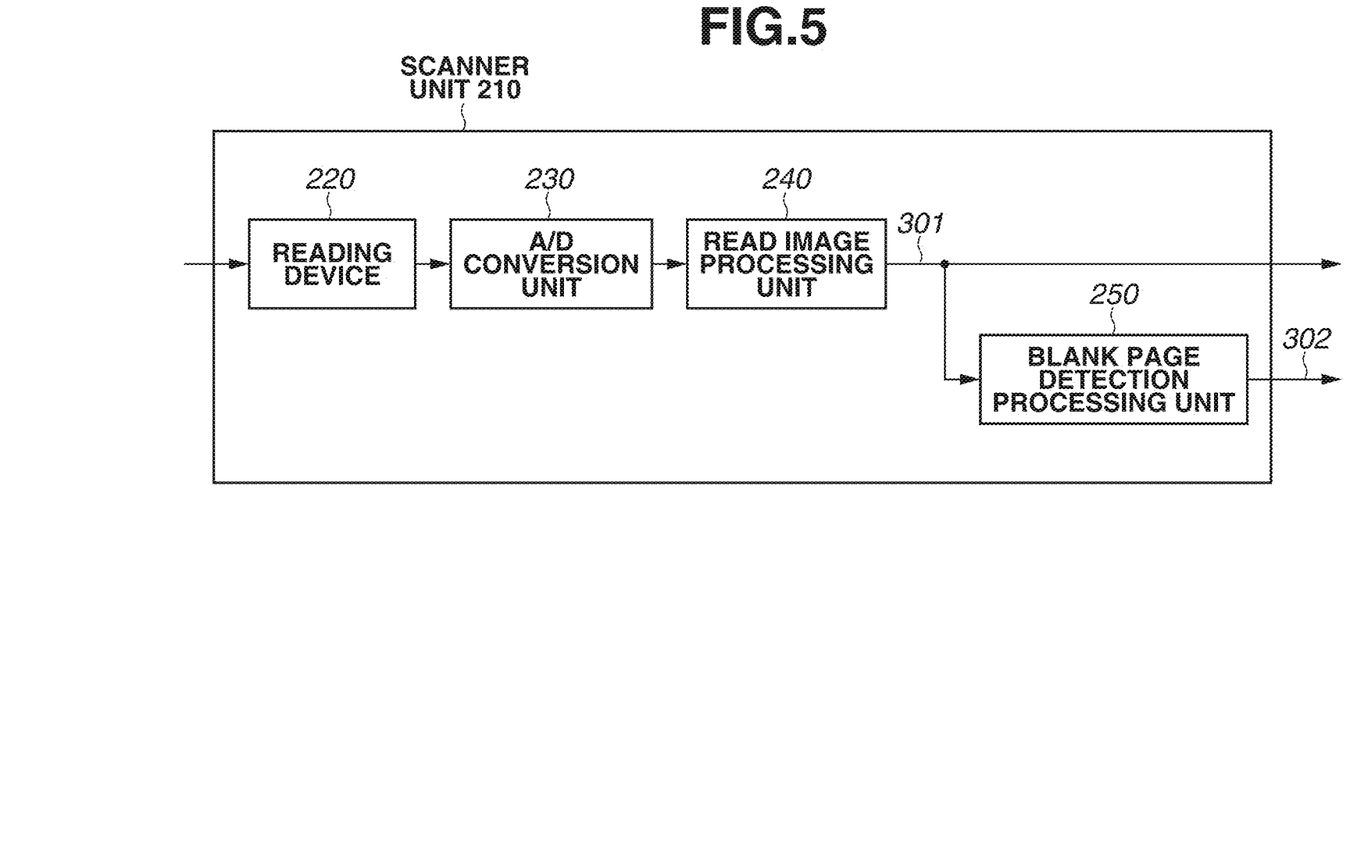
FIG. 5 is a diagram illustrating an internal configuration of the scanner unit.

FIG. 5 is a diagram illustrating an internal configuration of the scanner unit 210 illustrated in FIG. 4. Hereinafter, document reading performed in the scanner unit 210 will be described.

In FIG. 5, the reading device 220 includes a line sensor such as a CCD sensor, a complementary metal-oxide semiconductor (CMOS) sensor, or a contact image sensor (CIS). The image data of the document is read via the CCD sensor 1407 serving as the reading unit 220, and the read analog image data is output to a subsequent stage processing unit. An analog-to-digital (A/D) conversion unit 230 converts the data read by the reading device 220 into digital data.

A read image processing unit 240 executes processing such as shading correction for matching, in level, a highlight part (white) of the read image data with a dark part (black) thereof, modulation transfer function (MTF) correction, or high frequency suppression processing. A blank page detection processing unit 250 refers to image data 301 processed by the read image processing unit 240 to detect whether the read image data is a blank page. The scanner unit 210 outputs the image data 301, which has been obtained by performing image processing on the read document image data by the read image processing unit 240, together with a blank page detection result 302 by the blank page detection processing unit 250.

The output data and the blank page detection result of the scanner unit 210 are transferred to the storage unit 114 based on control of the controller unit 100. The storage unit 114 stores the transferred image data and the blank page detection result (a blank page flag).

[Blank Page Detection Processing Unit 250]

Figure 6:
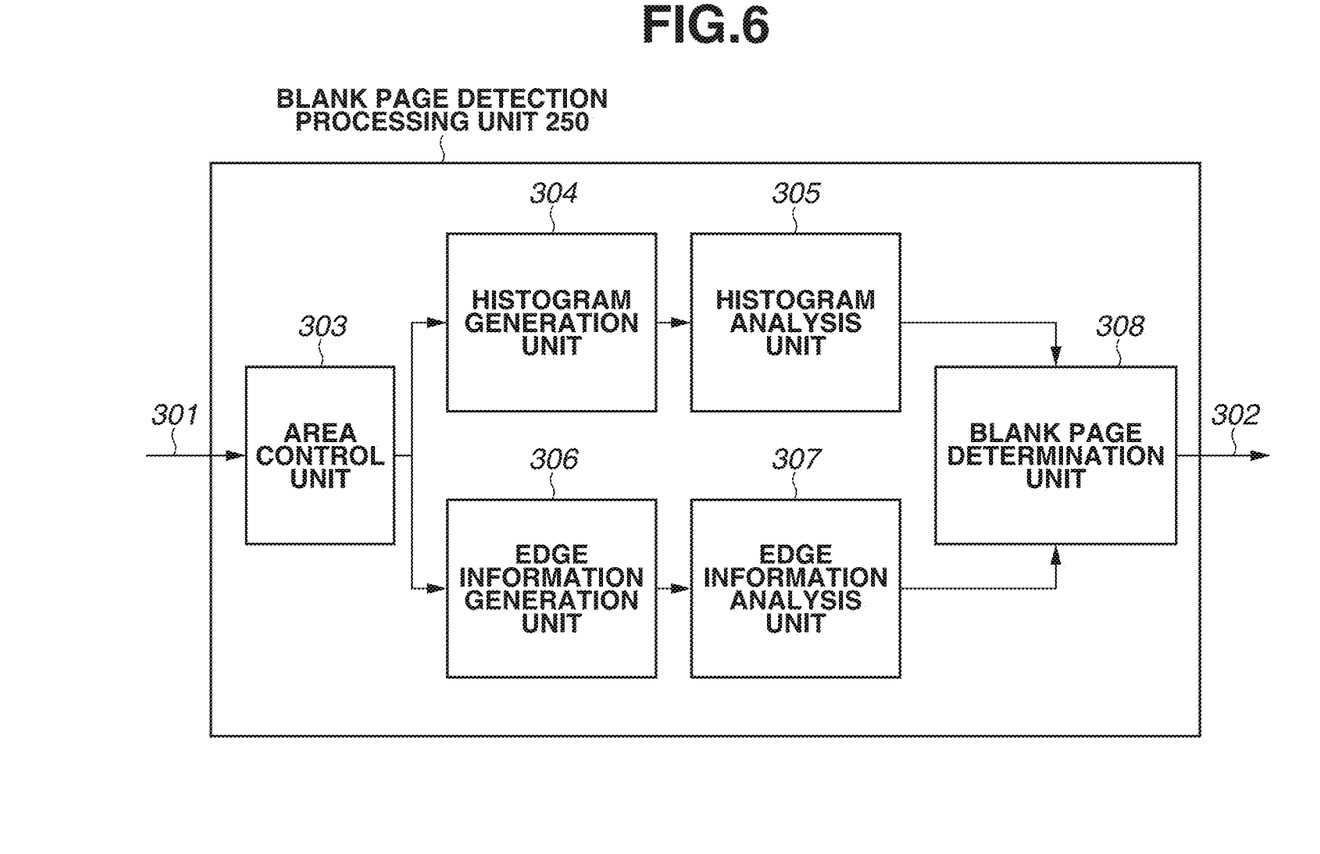
FIG. 6 is a diagram illustrating an internal configuration of a blank page detection processing unit illustrated in FIG. 5.

FIG. 6 is a diagram illustrating an internal configuration of the blank page detection processing unit 250 illustrated in FIG. 5.

In FIG. 6, the blank page detection processing unit 250 is connected to a register (not illustrated), and a control parameter and a processing result are stored therein. Writing in the register is carried out by the CPU 111 and the blank page detection processing unit 250, and the blank page detection processing unit 250 reads the control parameter set in the register to operate.

The image data 301 is digital image data output from the read image processing unit 240. The output result 302 from the blank page detection processing unit 250 is a signal indicating whether the digital image data is a blank page. An area control unit 303 controls an area for generating a histogram or edge information from the input image data.

A histogram generation unit 304 generates a histogram of a plurality of areas by using the image data 301. A histogram analysis unit 305 determines whether the document image is a blank page, based on the histogram generated by the histogram generation unit 304. An edge information generation unit 306 counts edges of a plurality of areas by using the image data 301.

An edge information analysis unit 307 determines whether the document image is a blank page, based on the number of edges generated by the edge information generation unit 306. A blank page determination unit 308 refers to a result of a plurality of threshold parameters used by the histogram analysis unit 305 and the edge information analysis unit 307 to output a result of determination as to whether the document is a blank page.

[Schematic Diagram of Image Data and Blank Page Flag]

Figure 7:
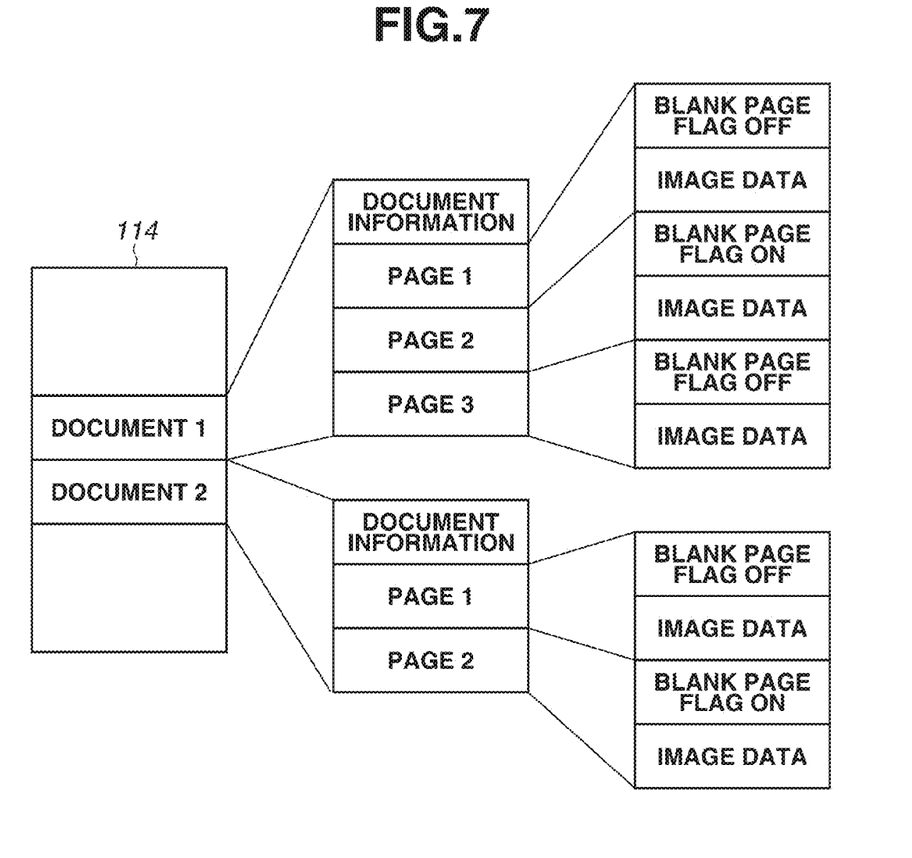
FIG. 7 is a diagram illustrating an image file or a document file stored in a document storage area.

FIG. 7 is a diagram illustrating an image file or a document file stored in a document storage area constituting a part of the storage unit 114 illustrated in FIG. 2.

In an example illustrated in FIG. 7, two document files of documents 1 and 2 are illustrated. The document 1 includes document information and three pages of pages 1 to 3. Each page stores a "blank page flag" determined by the blank page detection processing unit 250 and "image data" output from the read image processing unit 240 as a set. Similarly, the document 2 includes document information and two pages of pages 1 and 2. Each page includes a set of a blank page flag and image data to be stored. In this example, pages where blank page flags are ON, that is, image data of "the page 2 of the document 1" and "the page 2 of the document 2", are blank page image data.

[Operation Unit 50]

Figure 8:
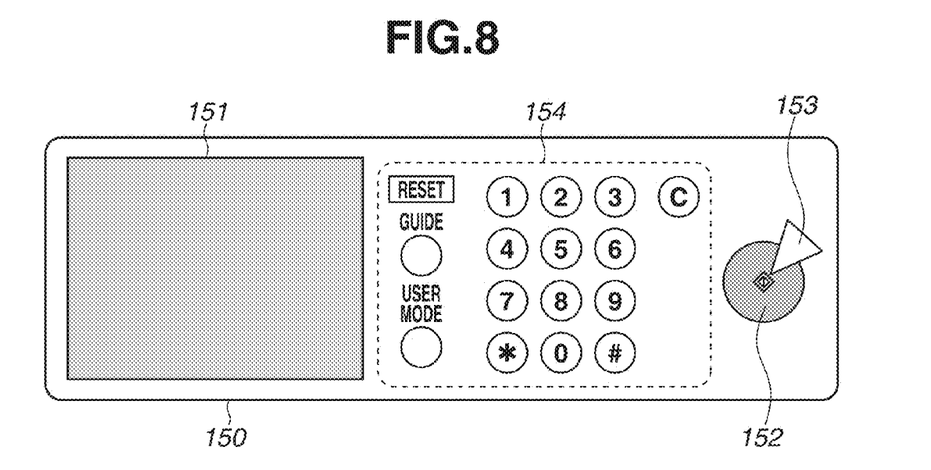
FIG. 8 is a diagram illustrating a configuration example of an operation unit illustrated in FIG. 2.

FIG. 8 is a diagram illustrating a configuration example of the operation unit 150 illustrated in FIG. 2.

In FIG. 8, a liquid crystal operation panel 151, which is formed by combining a liquid crystal with a touch panel, displays an operation screen, and when a display key is pressed by the user, transmits the information to the controller unit 100. Main mode setting and status display are carried out thereon. A start key 152 is used when a reading and printing operation of the document image is started or when a start of other functions is instructed. The start key 152 includes two-color LEDs of green and red. Lighting of the green LED indicates that an operation can be started. Lighting of the red LED indicates that an operation cannot be started. A stop key 153 has a function of stopping the on-going operation. A hard key group 154 includes a numerical keypad, a clear key, a reset key, a guide key, and a user mode key.

[Copy Processing Flow]

Figure 9:
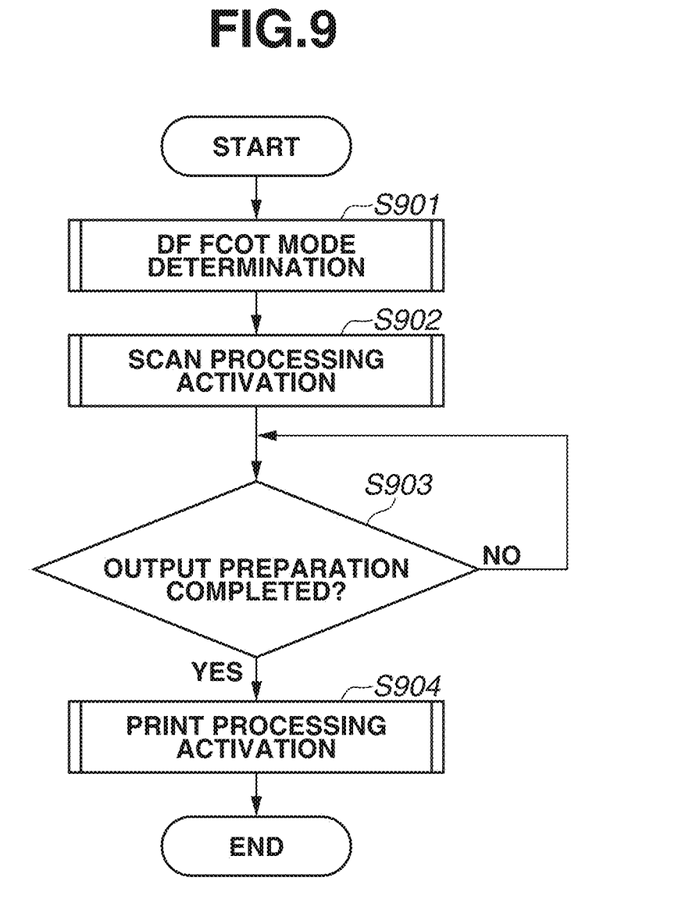
FIG. 9 is a flowchart illustrating a method for controlling the image forming apparatus.

FIG. 9 is a flowchart illustrating a method for controlling the image forming apparatus according to the present exemplary embodiment. This is an example of copy processing executed when a document is placed on the document feeding unit (DF unit) 280. A program related to the processing in the flowchart is controlled by the CPU 111 of the controller unit 100 sequentially loading the programs stored in the ROM 113 and the storage unit 114 into the RAM 112 to execute the programs.

Setting is carried out on a mode setting screen of the copy function via the liquid crystal operation panel 151 illustrated in FIG. 8. When the start key 152 is pressed, the processing is started. Since each setting mode of the copy function has a default value, the copy processing is started even when the start key 152 is pressed without performing setting. Each setting value is stored in the RAM 112 so as to be referred to in each process.

In step S901, the CPU 111 determines whether an operation mode is a first copy output time (FCOT) mode when copying from the document feeding unit (DF unit) 280. The CPU 111 stores a determination result of the FCOT mode in the RAM 112. In step S902, the CPU 111 activates scan processing. In step S903, the CPU 111 waits for notification of completion of output preparation from the scan processing. When the CPU 111 detects the completion of the output preparation from the scan processing (YES in step S903), the processing proceeds to step S904. In step S904, the CPU 111 activates print processing to end this processing.

[FCOT Mode Determination Flow]

Figure 10:
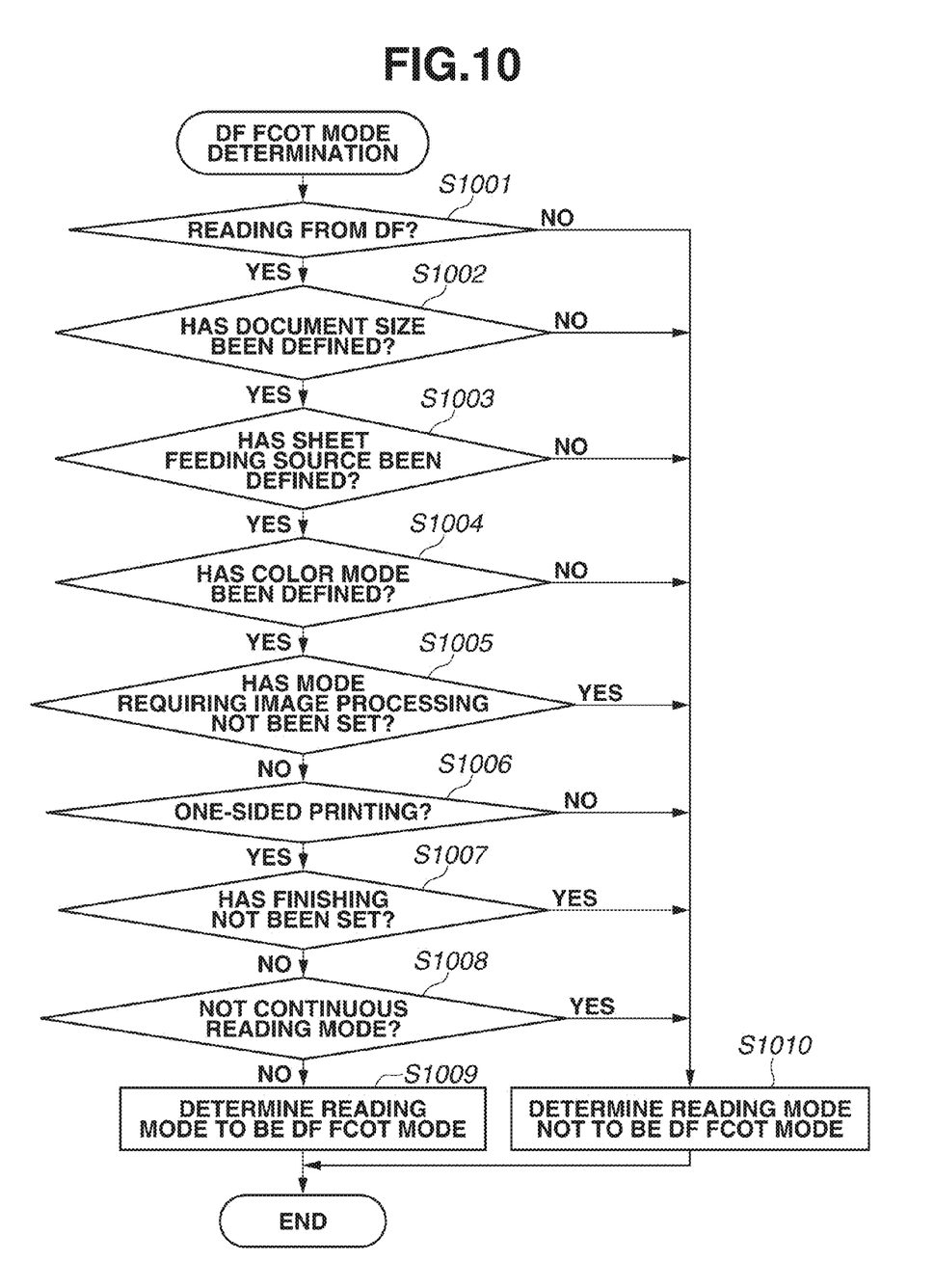
FIG. 10 is a flowchart illustrating a method for controlling the image forming apparatus.

FIG. 10 is a flowchart illustrating a method for controlling the image forming apparatus according to the present exemplary embodiment. This is an example of processing of determining whether an operation is performed with priority given to the FCOT mode (hereinafter, referred to as a DF FCOT mode) in the copy processing executed when the document is placed on the document feeding unit (DF unit) 280, based on set image forming conditions. A program related to the processing in the flowchart is controlled by the CPU 111 of the controller unit 100 sequentially loading the programs stored in the ROM 113 and the storage unit 114 into the RAM 112 to execute the programs. In the present exemplary embodiment, the image forming conditions include a document conveyance state, an image processing state of an image to be read from the document, and a document size. The image forming conditions further include a feeding destination definition state of a sheet to be fed by the printer device 300, a designation state of a print side of the sheet on which printing is to be performed, and a post-processing setting state of the sheet on which printing has been performed.

In step S1001, the CPU 111 determines whether an operation is document reading from the document feeding unit (DF unit) 280. When the CPU 111 determines that the operation is document reading from the DF unit 280 (YES in step S1001), the processing proceeds to step S1002. When the CPU 111 determines that the operation is not document reading from the DF unit 280 (NO in step S1001), the processing proceeds to step S1010.

In step S1002, the CPU 111 determines whether a document size has been defined. The case where the document size has been defined refers to a case where the document size has been identified by, for example, user's designation of the document size via the operation unit 150 or detection of the document size by a sensor of the document feeding unit 280. When the CPU 111 determines that a document size has been defined (YES in step S1002), the processing proceeds to step S1003. When the CPU 111 determines that a document size has not been defined (NO in step S1002), the processing proceeds to step S1010.

In step S1003, the CPU 111 determines whether a recording sheet feeding source has been defined, based on the document size defined in step S1002. When the CPU 111 determines that a recording sheet feeding source has been defined (YES in step S1003), the processing proceeds to step S1004. When the CPU 111 determines that a recording sheet feeding source has not been defined (NO in step S1003), the processing proceeds to step S1010.

In step S1004, the CPU 111 determines whether a print color mode such as a monochrome, color, auto, or single color mode has been defined. When the CPU 111 determines that a color mode has been defined (YES in step S1004), the processing proceeds to step S1005. When the CPU 111 determines that a color mode has not been defined (NO in step S1004), the processing proceeds to step S1010.

In step S1005, the CPU 111 determines whether a mode requiring image processing has not been set. In the present exemplary embodiment, the mode requiring image processing is, for example, repeated output, reduced/enlarged layout, enlarged continuous shooting, area processing, a scaling rate, image shifting, numbering, a stamp, a document numbering printing, bookbinding, image combining, a background pattern, or security information embedding.

When the CPU 111 determines that a mode requiring image processing has not been set (NO in step S1005), the processing proceeds to step S1006. When the CPU 111 determines that a mode requiring image processing has been set (YES in step S1005), the processing proceeds to step S1010.

In step S1006, the CPU 111 determines whether an operation is one-sided printing. When the CPU 111 determines that the operation is one-sided printing (YES in step S1006), the processing proceeds to step S1007. When the CPU 111 determines that the operation is not one-sided printing (NO in step S1006), the processing proceeds to step S1010.

In step S1007, the CPU 111 determines whether finishing processing such as stapling, punching, or folding has not been set. When the CPU 111 determines that finishing processing has not been set (NO in step S1007), the processing proceeds to step S1008. When the CPU 111 determines that finishing processing has been set (YES in step S1007), the processing proceeds to step S1010.

In step S1008, the CPU 111 determines whether a continuous reading mode for repeatedly reading documents from the document feeding unit 280 or a pressing plate before print output has not been set. When the CPU 111 determines that a continuous reading mode has not been set (NO in step S1008), the processing proceeds to step S1009. When the CPU 111 determines that a continuous reading mode has been set (YES in step S1008), the processing proceeds to step S1010.

In step S1009, the CPU 111 determines the reading mode to be a DF FCOT mode, and the processing is ended. In step S1010, the CPU 111 determines the reading mode not to be a DF FCOT mode, and the processing is ended. The CPU 111 stores the determination result of the FCOT mode in the RAM 112.

[Scan Processing Flow]

Figure 11:
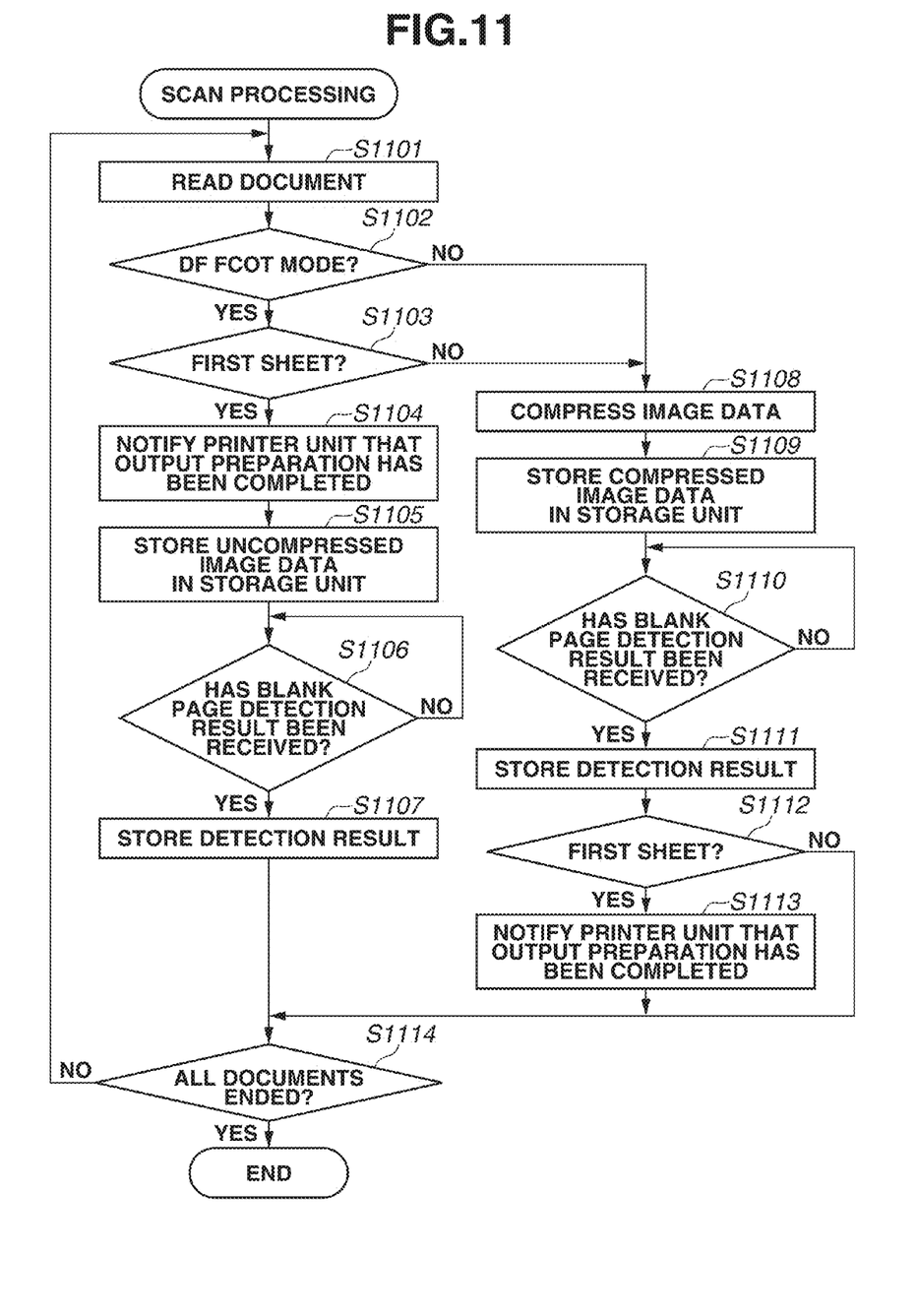
FIG. 11 is a flowchart illustrating a method for controlling the image forming apparatus.

FIG. 11 is a flowchart illustrating a method for controlling the image forming apparatus according to the present exemplary embodiment. This is an example of scan processing. The processing illustrated in the flowchart is executed by the CPU 111 of the controller unit 100 sequentially loading the programs stored in the ROM 113 and the storage unit 114 into the RAM 112.

When the scan processing is activated, the number of document readings stored in an area (not illustrated) on the RAM 112 is initialized to 0.

In step S1101, the CPU 111 operates the document feeding unit 280 to read a document, and increments the number of document readings stored on the RAM 112. The image data 301 transferred from the scanner unit 210 by the document reading is stored in an area (not illustrated) secured in the RAM 112.

In step S1102, the CPU 111 refers to the determination result of the FCOT mode stored in the RAM 112 to determine whether the reading mode is a DF FCOT mode. When the CPU 111 determines that the reading mode is a DF FCOT mode (YES in step S1102), the processing proceeds to step S1103. When the CPU 111 determines that the reading mode is not a DF FCOT mode (NO in step S1102), the processing proceeds to step S1108.

In step S1103, the CPU 111 determines whether the operation is reading of a first sheet, based on the number of document readings stored in the RAM 112. When the CPU 111 determines that the operation is reading of a first sheet (YES in step S1103), the processing proceeds to step S1104. When the CPU 111 determines that the operation is not reading of a first sheet (the operation is reading of a second or subsequent page)(NO in step S1103), the processing proceeds to step S1108. In step S1104, the CPU 111 notifies the printer unit 300 that output preparation has been completed. In step S1105, the CPU 111 stores, in the storage unit 114, the image data 301 of the document that is stored in an area (not illustrated) secured in the RAM 112.

In step S1106, the CPU 111 determines whether a blank page detection result 302 transferred from the scanner unit 210 has been received. When the CPU 111 determines that a blank page detection result 302 has been received (YES in step S1106), the processing proceeds to step S1107. When the CPU 111 determines that a blank page detection result 302 has not been received (NO in step S1106), the CPU 111 waits for reception of a determination result.

In step S1107, the CPU 111 stores the blank page detection result 302 received in step S1106 in the storage unit 114. In step S1108, the CPU 111 compresses the image data 301 of the document that is stored in the area (not illustrated) secured in the RAM 112. In step S1109, the CPU 111 stores the image data compressed in step S1108 in the storage unit 114.

In step S1110, the CPU 111 determines whether a blank page detection result 302 transferred from the scanner unit 210 has been received. When the CPU 111 determines that a blank page detection result 302 has been received (YES in step S1110), the processing proceeds to step S1111. When the CPU 111 determines that a blank page detection result 302 has not been received (NO in step S1110), the CPU 111 waits for reception of a determination result. In step S1111, the CPU 111 stores the blank page detection result 302 received in step S1110 in the storage unit 114.

In step S1112, the CPU 111 determines whether the operation is reading of a first sheet, based on the number of document readings stored in the RAM 112. When the CPU 111 determines that the operation is reading of a first sheet (YES in step S1112), the processing proceeds to step S1113. When the CPU 111 determines that the operation is not reading of a first sheet (NO in step S1112), the processing proceeds to step S1114. In step S1113, the CPU 111 notifies the printer unit 300 that output preparation has been completed.

In step S1114, the CPU 111 determines whether reading of all the documents placed on the document feeding unit 280 has ended. When the CPU 111 determines that reading of all the documents placed on the document feeding unit 280 has not ended (NO in step S1114), the processing returns to step S1101 to read a next document. When the CPU 111 determines that reading of all the documents placed on the document feeding unit 280 has ended (YES in step S1114), the processing is ended.

[Print Processing Flow]

Figure 12:
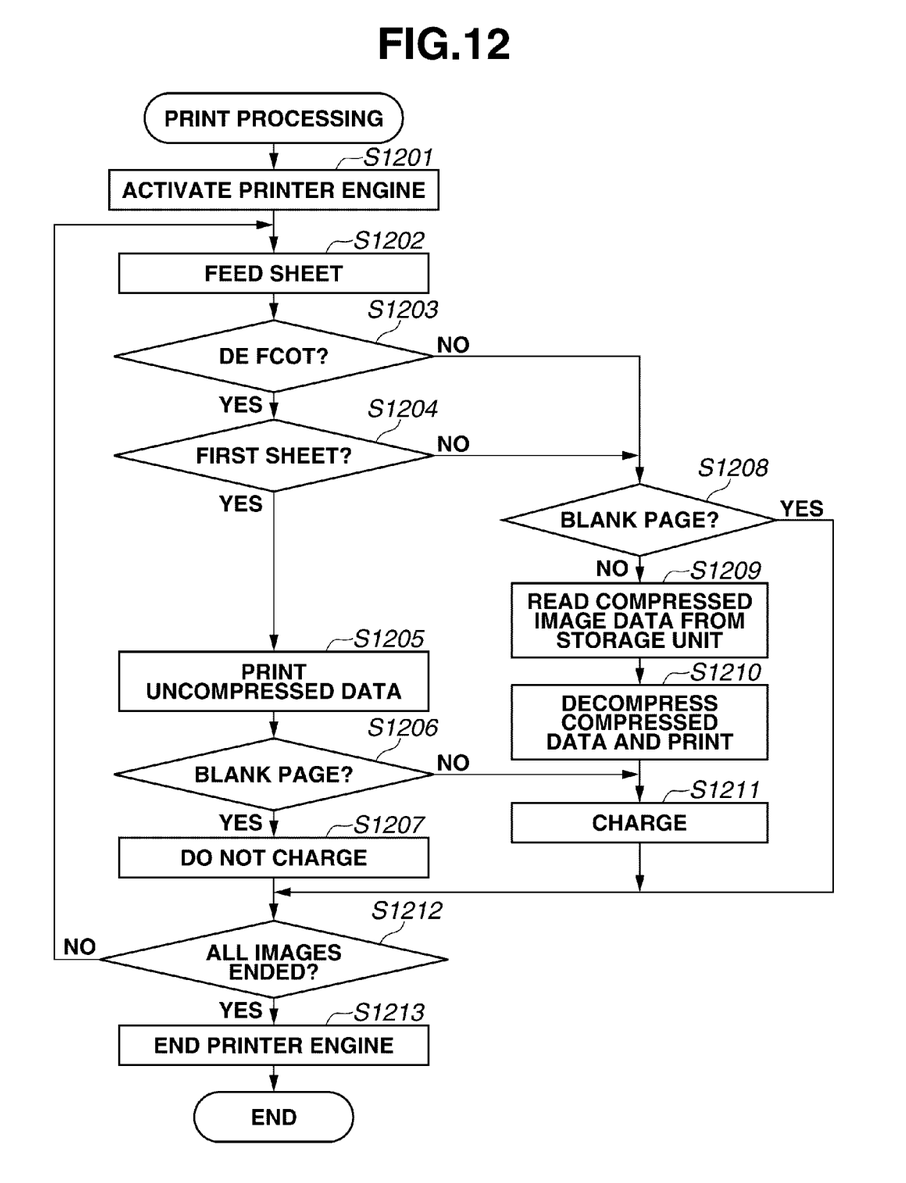
FIG. 12 is a flowchart illustrating a method for controlling the image forming apparatus.

FIG. 12 is a flowchart illustrating a method for controlling the image forming apparatus according to the present exemplary embodiment. This is an example of print processing. The processing illustrated in the flowchart is executed by the CPU 111 of the controller unit 100 sequentially loading the programs stored in the ROM 113 and the storage unit 114 into the RAM 112.

When the print processing is activated, the CPU initializes the number of output sheet feedings stored in an area (not illustrated) on the RAM 112 to 0.

In step S1201, the CPU 111 activates a printer engine in order to increase a temperature of the fixing unit 327. In step S1202, the CPU 111 feeds an output sheet from the sheet feeding source referred to in the determination in step S1003 and increments the number of sheet feedings stored in the RAM 112.

In step S1203, the CPU 111 refers to the determination result of the FCOT mode stored in the RAM 112 to determine whether a reading mode is a DF FCOT mode. When the CPU 111 determines that the reading mode is a DF FCOT mode (YES in step S1203), the processing proceeds to step S1204. When the CPU 111 determines that the reading mode is not a DF FCOT mode (NO in step S1203), the processing proceeds to step S1208.

In step S1204, the CPU 111 determines whether the fed sheet is a first output sheet, based on the number of sheet feedings stored in the RAM 112. When the CPU 111 determines that the fed sheet is a first output sheet (YES in step S1204), the processing proceeds to step S1205. When the CPU 111 determines that the fed sheet is not a first output sheet (NO in step S1204), the processing proceeds to step S1208. In step S1205, the CPU 111 executes printing by using the uncompressed image data stored in the RAM 112 in step S1105.

In step S1206, the CPU 111 determines whether the output image data is a blank page, based on the blank page detection result 302 stored in the storage unit 114 in step S1107. When the CPU 111 determines that the output image data is a blank page (YES in step S1206), the processing proceeds to step S1207. When the CPU 111 determines that the output image data is not a blank page (NO in step S1206), the processing proceeds to step S1211.

In step S1207, since the output is a blank page output, the CPU 111 executes control so as not to perform charging processing at a charging device such as a charging counter or a coin vendor.

In step S1208, the CPU 111 identifies a page to be printed on the output sheet fed in step S1202 among pages stored in the storage unit 114, and determines whether the image data is a blank page, based on the blank page detection result stored in step S1111. When the CPU 111 determines that the image data is a blank page (YES in step S1208), the processing proceeds to step S1212. When the CPU 111 determines that the image data is not a blank page (NO in step S1208), the processing proceeds to step S1209.

In step S1209, the CPU 111 reads the image data compressed in step S1108 and stored in step S1109, from the storage unit 114 into the RAM 112. In step S1210, the CPU 111 decompresses the compressed image data read into the RAM 112 and prints the decompressed data. In step S1211, the CPU 111 executes control to perform charging for the printing, at a charging device such as a charging counter or a coin vendor.

In step S1212, the CPU 111 determines whether printing of all the images has ended. When the CPU 111 determines that printing of all the images has ended (YES in step S1212), the processing proceeds to step S1213. When the CPU 111 determines that printing of all the images has not ended (NO in step S1212), the processing returns to step S1202 to print a next image. In step S1213, the CPU 111 ends the printer engine to end the processing.

By performing aforementioned control, in the image forming apparatus that carries out blank page detection, a time until output of a first sheet (a first copy output time) when copying from the DF can be shortened. Furthermore, when the user performs a FCOT operation after misplacing the front/rear of the document on the DF, charging can be avoided. As a result, a highly convenient image forming apparatus giving no stress to the user can be provided.

Specific exemplary embodiments of the present invention have been described above. However, the present invention is not limited to the above exemplary embodiments.

The respective processes of the present invention can also be achieved by executing software (a program) acquired via a network or various types of storage media by a processing device (CPU or processor) of a personal computer (computer) or the like.

The present invention is not limited to the above exemplary embodiments. Various modifications (including organic combination of exemplary embodiments) can be made based on the gist of the present invention, and these are within the scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-034455 filed Feb. 25, 2014, which is hereby incorporated by reference herein in its entirety.

What is claimed is:

1. An image forming apparatus comprising:
a reading unit configured to read an image of a conveyed document;
a printing unit configured to print, on a sheet according to notification of completion of image output preparation, the image of the document read by the reading unit;
a detection unit configured to detect a blank page from the image of the document read by the reading unit; and
a control unit configured to,
in a case where the document read by the reading unit is a first page, notify the printing unit of the completion of the image output preparation before the detection unit detects a blank page, and
in a case where the document read by the reading unit is not a first page, notify the printing unit of the completion of the image output preparation after the detection unit detects the blank page.

2. The image forming apparatus according to claim 1, further comprising a judging unit configured to judge whether an operation mode is an operation mode for shortening a time until the image of the document read by the reading unit is output on a first sheet,
wherein, in a case where the judging unit judges the operation mode is the operation mode for shortening the time and the document read by the reading unit is a first page, the control unit notifies the printing unit of the completion of the image output preparation before the detection unit detects the blank page.

3. The image forming apparatus according to claim 2, wherein the judging unit judges whether an operation mode is the mode, based on an image forming condition of the image of the document read by the reading unit.

4. The image forming apparatus according to claim 3, wherein the image forming condition includes a condition for printing the image of the document read by the reading unit on both sides of a sheet.

5. The image forming apparatus according to claim 1, further comprising:
   a compression unit configured to compress image data obtained by reading the document by the reading unit; and
   a storage unit configured to store the image data compressed by the compression unit,
   wherein, in a case where the document read by the reading unit is a first page, image data obtained by reading the document by the reading unit is stored in the storage unit without being compressed.

6. The image forming apparatus according to claim 1, further comprising a charging unit configured to execute charging processing each time the printing unit prints an image on a sheet.

7. The image forming apparatus according to claim 6, wherein, in a case where the document read by the reading unit is a first page and the detection unit detects a blank page, the charging unit does not execute the charging processing.

8. A method for controlling an image forming apparatus including a reading unit configured to read an image of a conveyed document and a printing unit configured to print, on a sheet according to notification of completion of image output preparation, the image of the document read by the reading unit, the method comprising:
   detecting a blank page from the image of the document read by the reading unit; and
   notifying, in a case where the document read by the reading unit is determined to be a first page, the printing unit of the completion of the image output preparation before the detecting detects a blank page; and
   notifying, in a case where the document read by the reading unit is determined to be not a first page, the printing unit of the completion of the image output preparation after the detecting detects a blank page.

9. A non-transitory storage medium storing a program for causing a computer to execute a method for controlling an image forming apparatus including a reading unit configured to read an image of a conveyed document and a printing unit configured to print, on a sheet according to notification of completion of image output preparation, the image of the document read by the reading unit, the method comprising:
   detecting a blank page from the image of the document read by the reading unit;
   determining whether the document read by the reading unit is a first page;
   notifying, in a case where the document read by the reading unit is determined to be a first page, the printing unit of the completion of the image output preparation before the detection unit detects a blank page; and
   notifying, in a case where the document read by the reading unit is determined to be not a first page, the printing unit of the completion of the image output preparation after the detection unit detects a blank page.

* * * * *